US009061271B2

(12) United States Patent
Linhart et al.

(10) Patent No.: US 9,061,271 B2
(45) Date of Patent: Jun. 23, 2015

(54) CERAMIC BODY COMPOSED OF AN ALUMINUM TITANATE MIXTURE (71) Applicant: MANN+HUMMEL GMBH, Ludwigsburg (DE)

(72) Inventors: Jochen Linhart, Schwaikheim (DE); Frank Ehlen, Neunkirchen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/951,395

(22) Filed: Jul. 25, 2013

(65) Prior Publication Data
US 2013/0310247 A1 Nov. 21, 2013

Related U.S. Application Data (63) Continuation of application No. PCT/EP2012/051466, filed on Jan. 30, 2012.

(30) Foreign Application Priority Data

Jan. 28, 2011 (DE) .......................... 10 2011 009 760

(51) Int. Cl.
C04B 35/46 (2006.01)
B01J 23/78 (2006.01)
(Continued)

(52) U.S. Cl.
CPC ............... *B01J 23/78* (2013.01); *C04B 35/478* (2013.01); *C04B 35/62625* (2013.01); *C04B 38/0615* (2013.01); *C04B 2111/00793* (2013.01); *C04B 2235/3201* (2013.01); *C04B 2235/3203* (2013.01); *C04B 2235/3205* (2013.01); *C04B 2235/3206* (2013.01); *C04B 2235/3208* (2013.01); *C04B 2235/3215* (2013.01);
(Continued)

(58) Field of Classification Search
CPC .... C04B 35/46; C04B 35/495; C04B 35/465; H01B 3/12
USPC .......................................... 501/134, 135, 136
See application file for complete search history.

(56) References Cited

U.S. PATENT DOCUMENTS 5,153,153 A * 10/1992 Freudenberg et al. ........ 501/127
5,288,672 A 2/1994 Gugel et al.
(Continued)

FOREIGN PATENT DOCUMENTS

WO 2011008938 A1 1/2011

*Primary Examiner* — Noah Wiese
(74) *Attorney, Agent, or Firm* — James Hasselbeck (57) ABSTRACT A ceramic body based on an aluminum titanate system has the following composition:
i) approximately >95% by weight $Al_2O_3 \cdot TiO_2$;
ii) approximately 0.1-approximately 5.0% by weight $SiO_2$;
iii) approximately 0.1-approximately 5.0% by weight MgO;
iv) approximately 0-approximately 2.0% by weight $Fe_2O_3$;
v) approximately 0-approximately 1.0% by weight BeO, BaO or CaO;
vi) approximately 0-approximately 1.0% by weight $Li_2O$, $Na_2O$ or $K_2O$;
vii) approximately 0-approximately 2% by weight impurities.

The ceramic body has a mass ratio $TiO_2:Al_2O_3$ that is in a range between approximately 0.75 and approximately 0.95.

17 Claims, 2 Drawing Sheets (51) Int. Cl.
   *C04B 35/478*   (2006.01)
   *C04B 35/626*   (2006.01)
   *C04B 38/06*    (2006.01)
   *B01J 23/02*    (2006.01)
   *B28B 1/00*     (2006.01)
   *C04B 111/00*   (2006.01)
   *F01N 3/022*    (2006.01)

(52) U.S. Cl.
   CPC . *C04B2235/3222* (2013.01); *C04B 2235/3234* (2013.01); *C04B 2235/3272* (2013.01); *C04B 2235/3418* (2013.01); *C04B 2235/36* (2013.01); *C04B 2235/5436* (2013.01); *C04B 2235/5445* (2013.01); *C04B 2235/72* (2013.01); *F01N 3/0222* (2013.01); *F01N 2330/06* (2013.01); *B01J 23/02* (2013.01); *B28B 1/00* (2013.01)

(56) References Cited

U.S. PATENT DOCUMENTS

| | | | |
|---|---|---|---|
| 7,722,798 | B2 | 5/2010 | Takahashi |
| 8,663,777 | B2 | 3/2014 | Suwabe et al. |
| 2007/0186911 | A1* | 8/2007 | Gerlach et al. ............ 123/556 |
| 2010/0222200 | A1* | 9/2010 | Tepesch et al. ............ 501/83 |
| 2010/0298114 | A1* | 11/2010 | Maki et al. ............ 501/136 |
| 2010/0317508 | A1* | 12/2010 | Maki et al. ............ 501/136 |
| 2011/0248106 | A1* | 10/2011 | Maki et al. ............ 241/25 |

* cited by examiner

CERAMIC BODY COMPOSED OF AN ALUMINUM TITANATE MIXTURE

CROSS-REFERENCE TO RELATED APPLICATIONS

This application is a continuation application of international application No. PCT/EP2012/051466 having an international filing date of 30 Jan. 2012 and designating the United States, the international application claiming a priority date of 28 Jan. 2011, based on prior filed German patent application No. 10 2011 009 760.0, the entire contents of the aforesaid international application and the aforesaid German patent application being incorporated herein by reference.

BACKGROUND OF THE INVENTION

The invention concerns in general ceramic bodies. In particular, the invention concerns such ceramic bodies on the basis of aluminum titanate.

Such ceramic bodies are used, for example, as filter devices for soot particle removal, hot gas filtration, liquid filtration as well as in exhaust gas after treatment of spontaneous ignition internal combustion engines, in particular in diesel engine-operated as well as gasoline engine-operated motor vehicles. Moreover, the aforementioned ceramic bodies can also be used as heat insulation material. Usually, such filters are made of a ceramic material, for example, cordierite or silicon carbide. Ceramic bodies of cordierite find use in a plurality of high temperature applications, for example, catalytic converters, NOx adsorbers, electrically heated catalysts, chemical process substrates, and also diesel fuel particulate filters.

In the filtration of diesel exhaust gases, cordierite as an inexpensive material that has a low thermal expansion coefficient has been the material of choice for a long time. Porous cordierite ceramic filters have been used in the form of wall-flow filters since the early '80s for removal of particles in the exhaust gas flow of diesel engines. Wall-flow filters have in general a cylindrical shape with two end faces and a jacket surface and have a plurality of flow passages for the exhaust gases of the diesel engine, the flow passages passing through the filters from the first end face to the second end face and extending substantially parallel to the cylinder axis. The cross-sectional shape of the wall-flow filters depends on the mounting conditions at the vehicle. Widely used are filter bodies with round, elliptical or triangular cross-section. The flow passages have usually a square or hexagonal cross-section and are arranged in a tight pattern across the entire cross-section of the filter body.

A diesel particle filter combines ideally a low thermal expansion coefficient, a minimal pressure loss, high-strength, and minimal cost. Problems that may be encountered upon use of cordierite comprise low volumetric thermal capacity and low thermal conductivity; this leads to unacceptably high temperatures or temperature peaks during operation as well as a minimal thermal and chemical resistance. Moreover, inorganic particles contained in the diesel exhaust gas may react with the cordierite and may cause filter failure.

An alternative material to cordierite for producing diesel particulate filters is silicon carbide (SiC). Even though this material has a high-volumetric thermal capacity as well as a high thermal conductivity, it also has a low resistance to temperature changes as a result of a relatively high thermal expansion and a high modulus of elasticity. This makes it necessary to segment SiC filters in order to prevent failure during use. Also, the processing requirements (i.e., high temperatures, inert atmosphere, and segmentation) result in high manufacturing costs.

Recently, ceramic filter elements on the basis of aluminum titanate have been developed that exhibit suitable properties for use at high temperatures (e.g. hot gas filtration) such as, for example, in vehicle exhaust gas control and diesel exhaust after-treatment systems, e.g. as diesel particulate filters or also particulate filters for gasoline engines. Aluminum titanate is the stoichiometric mixed phase of aluminum oxide and titanium dioxide. It is characterized by a low thermal conductivity, a low modulus of elasticity as well as a macroscopically minimal thermal expansion coefficient and an excellent resistance to temperature changes correlated therewith.

DE 602 17 084 T2 discloses a honeycomb structure with a plurality of honeycomb segments which are connected to a unitary body. The main component of each of the honeycomb segments comprises at least one of silicon carbide, silicon nitride, cordierite, aluminum oxide, mullite, zirconium dioxide, zirconium phosphate, aluminum titanate, titanium dioxide, and combinations thereof.

DE 10 2006 040 739 A1 discloses a filter for removal of particles from a gas stream, in particular of soot particles from an exhaust gas stream of an internal combustion engine, comprising a filter body of a ceramic filter substrate wherein the filter substrate is coated with a porous protective layer of a coating material. The coating material is selected from the group consisting of aluminum oxides, aluminum hydroxide, titanium dioxide, silicon dioxide, zirconium dioxide, cerium oxide, aluminum silicate, magnesium aluminum silicate, cordierite, mullite, silicon carbide, aluminum titanate, zeolite, quartz, glasses, mixtures thereof, and mixed oxides thereof.

Finally, WO 2005/046840 discloses a ceramic body for use as a diesel particulate filter with a composition that comprises: $a(Al_2O_3.TiO_2)+b(CaO.Al_2O_3.2SiO_2)+c(SrO.Al_2O_3.2SiO_2)+d(BaO.Al_2O_3.2SiO_2)+e(3Al_2O_3.2SiO_2)+f(Al_2O_3)+g(SiO_2)+h(Fe_2O_3.2TiO_2)+i(MgO+2TiO_2)$ wherein a, b, c, d, e, f, g, h, and i are weight fractions of each component so that $(a+b+c+d+e+f+g+h+i)=1$ and the following conditions are fulfilled: $0.5<a<0.95$; $0 \le b \le 0.5$; $0 \le c \le 0.5$; $0 \le d \le 0.5$; $0 \le e \le 0.5$; $0 \le f \le 0.5$; $0 \le g \le 0.1$; $0 \le h \le 0.3$ $0 \le i \le 0.3$; $b+d>0.1$. This is a mixture of aluminum titanate and a glass phase wherein the glasses are those of alkaline earth, alkali, silicon dioxide, aluminum dioxide, alkali and alkaline earth glasses. Moreover, the mixture contains a mineral phase, for example barium, calcium, and strontium feldspars. The ceramic bodies are produced by plastic shaping methods, for example, extrusion. A disadvantage is that feldspar is a natural raw material that is subject to fluctuations and also may contain impurities. Strontium feldspar is moreover very difficult to procure. Further disadvantages of the barium, calcium, and strontium feldspars are their high sintering temperature and difficult processibility. Calcium and in particular barium compounds are irritant; strontium components are weakly radioactive.

In addition to the manufacture by plastic shaping methods, e.g. extrusion, such ceramic bodies or filter devices are also produced in that a non-flammable support web is impregnated with a ceramic slip and subsequently a rigid filter body is formed. In Patent Abstracts of Japan JP 63134020 A, for example, a ceramic filter element for an exhaust gas filter in an internal combustion engine is disclosed that is comprised of a corrugated, spirally wound filter web. For producing the filter web, heat-resistant inorganic fibers are mixed in an aqueous suspension with ceramic powder and processed to a web. Several stacked webs are then rolled to the desired shape of the filter body wherein between neighboring filter webs honeycomb-shaped flow passages are formed. The filter body is subsequently fired at high temperature.

WO 2006/005668 discloses a further method for producing a ceramic filter element in an exhaust gas filter for internal combustion engines. In this method, first a flammable, non-ceramic support web is impregnated with a ceramic slip and subsequently, in the desired geometric shape, fired to such an extent that the support web is combusted and a rigid filter body remains.

The invention has the object to provide ceramic bodies on the basis of aluminum titanate that have a high thermal and chemical resistance, high long-term stability/resistance to breakdown in reducing and oxidizing atmosphere as well as excellent material characteristics (in particular, thermal expansion coefficients and, correlated therewith, very good resistance to temperature changes).

SUMMARY OF THE INVENTION

In accordance with the present invention, this is achieved in that a ceramic body on the basis of aluminum titanate is provided which is phased-stabilized by addition of special inorganic compounds, wherein the ceramic body has a defined composition. Furthermore, the object is solved by providing a ceramic slip that can be used for producing the ceramic bodies.

DESCRIPTION OF THE PREFERRED EMBODIMENTS

The ceramic body according to the invention can be used, for example, as a catalyst. Primarily, it is used however as a hot gas filter, a liquid filter, and in particular as a diesel particulate filter or particulate filter for a gasoline engine. In the following, the use as a diesel particulate filter is disclosed as an example.

Figure 1:
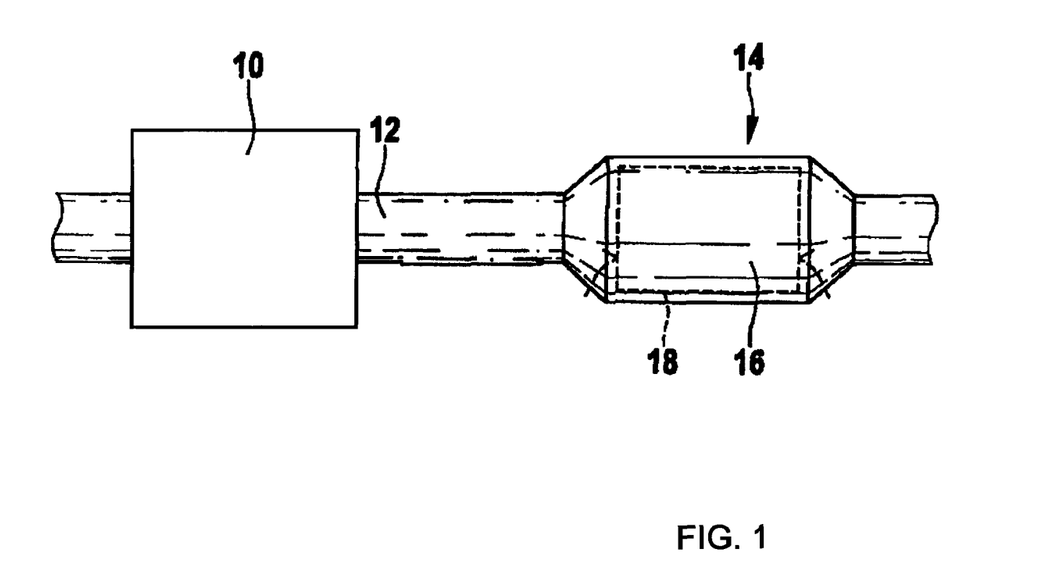
FIG. 1 shows a schematic illustration of an internal combustion engine with a filter device that comprises a ceramic body according to the invention.

FIG. 1 shows a schematic illustration of an internal combustion engine with a filter device that has a ceramic body according to the invention. The internal combustion engine 10 is connected to an exhaust gas pipe 12 in which the filter device 14 with the ceramic body according to the invention is arranged. With the filter device 14 soot particles are filtered out from the exhaust gas flowing in the exhaust gas pipe 12. This is required in particular in connection with diesel engines in order to fulfill legal regulations.

The filter device 14 comprises in the illustrated embodiment a cylindrical housing 16 in which, for example, a filter element 18 of a ceramic body according to the invention is arranged; the filter element 18 has rotational symmetry and, as a whole, is also cylindrical. Other housing shapes are also possible. The filter element 18 comprises aluminum titanate.

In a first embodiment, the ceramic body according to the invention has the following composition of elements (given as oxide):
i) approximately >95% by weight $Al_2O_3.TiO_2$;
ii) approximately 0.1-approximately 5.0% by weight $SiO_2$;
iii) approximately 0.1-approximately 5.0% by weight MgO;
iv) 0-approximately 2.0% by weight $Fe_2O_3$;
v) 0-approximately 1.0% by weight BeO, BaO or CaO;
vi) 0-approximately 1.0% by weight $Li_2O$, $Na_2O$ or $K_2O$;
vii) 0-approximately 2% by weight impurities.

In a further embodiment, the ceramic body according to the invention has the following composition of elements (given as oxide):
i) approximately >95% by weight $Al_2O_3.TiO_2$;
ii) approximately 0.1-approximately 5.0% by weight $SiO_2$;
iii) approximately 0.1-approximately 5.0% by weight MgO;
iv) 0-approximately 2.0% by weight $Fe_2O_3$;
v) 0-approximately 1.0% by weight BeO, BaO or CaO;
vi) 0-approximately 1.0% by weight $Li_2O$, $Na_2O$ or $K_2O$;
vii) 0-approximately 2.0% by weight impurities;
and has a ratio of $TiO_2$ to $Al_2O_3$ that is in a range between approximately 0.75 and approximately 0.95.

In a further embodiment, the ceramic body according to the invention has the following composition of elements (given as oxide):
i) >95% by weight $Al_2O_3.TiO_2$;
ii) 0.1-5.0% by weight $SiO_2$;
iii) 0.1-5.0% by weight MgO;
iv) 0-2.0% by weight $Fe_2O_3$;
v) 0-1.0% by weight BeO, BaO or CaO;
vi) 0-1.0% by weight $Li_2O$, $Na_2O$ or $K_2O$;
wherein the impurities (vii) are <0.5-2.0% by weight.

In a further embodiment, the ceramic body according to the invention has the following composition of elements (given as oxide):
1) >95% by weight $Al_2O_3.TiO_2$;
2) 0.1-5% by weight $SiO_2$;
3) 0.1-5% by weight MgO;
4) 0-2% by weight $Fe_2O_3$;
5) 0-1% by weight RO (R=Be, Ca, Ba); 0-1% by weight $R'_2O$ (R'=Li, Na, K); and
   0.1-2% by weight impurities.

In a further embodiment, the ceramic body according to the invention has the following composition of elements (given as oxide):
1) >95% by weight $Al_2O_3.TiO_2$;
2) 0.1-5% by weight $SiO_2$;
3) 0.1-5% by weight MgO;
4) 0-2% by weight $Fe_2O_3$;
5) 0-1% by weight RO (R=Be, Ca, Ba); 0-1% by weight $R'_2O$ (R'=Li, Na, K); and
   0.5-2% by weight impurities.

In a further embodiment, the ceramic body according to the invention has the following composition of elements:
1) >95% by weight $Al_2O_3.TiO_2$;
2) 0.1-5% by weight $SiO_2$;
3) 0.7-5% by weight MgO;
4) 0-2% by weight $Fe_2O_3$;
5) 0-1% by weight CaO; and
   0.1-2% by weight impurities.

In a further embodiment, the ceramic body according to the invention has the following composition of elements:
1) >95% by weight $Al_2O_3.TiO_2$;
2) 0.1-5% by weight $SiO_2$;
3) 0.7-5% by weight MgO;
4) 0-2% by weight $Fe_2O_3$;
5) 0-1% by weight CaO; and
   0.5-2% by weight by weight impurities.

The addition of MgO serves to stabilize the aluminum titanate phase under reducing conditions in the critical temperature range of approximately 900° C. to 1,300° C. As an MgO source, $MgTiO_3$, $Mg_2TiO_4$, $MgTi_2O_5$, and $MgAl_2O_4$ are taken into consideration, for example.

The addition of $SiO_2$ or optionally additionally also CaO or $Fe_2O_3$ is advantageous for stabilizing the aluminum titanate phase under oxidizing conditions in the critical temperature range of approximately 900° C. to 1,300° C. The stabilization of the phase is determined by measurement and comparison of the thermal expansion coefficient (TEC) before and after aging. All of the TEC measurements were carried out with a NETZSCH pushrod dilatometer (type 402 C) with a heating rate of 5 K/min in an air atmosphere in a NETZSCH application laboratory. $SiO_2$ is moreover important for increasing the mechanical strength of the ceramic body on the basis of aluminum titanate.

The use of a CaO glass frit as an $SiO_2$ source is advantageous. In a preferred embodiment, glass frits of the types 40 580 TF, 10 083 or 10 1911-D of the company Ferro are used. The use of a glass frit as a $SiO_2$ source wherein a CaO glass frit is particularly advantageous has the advantage of a low melting temperature (1,000 to 1,200° C.) and of an improved flow behavior and thus also of a more homogenous distribution in comparison to the use of pure $SiO_2$. This provides a higher mechanical strength of the aluminum titanate material, a more effective action of the $SiO_2$ as a phase stabilizer, and a positive effect of CaO on the phase stabilization.

It was found that a quantity of $SiO_2$ within a range of approximately 0.1 to approximately 5.0% by weight is advantageous. Particularly preferred ranges of $SiO_2$ are between approximately 1.0 to approximately 4.5% by weight, between approximately 1.0 and approximately 4.0% by weight, and between approximately 2.5 and approximately 3.6% by weight, and between approximately 3.0 and approximately 3.1% by weight.

Inasmuch as iron oxide is added to the ceramic body, it is preferably used in quantities in a range of approximately 0.1 to approximately 1.1% by weight. Particularly advantageous are quantities of $Fe_2O_3$ between approximately 0.2 and approximately 0.3% by weight.

Advantageously, the ratio of $Al_2O_3$ to $TiO_2$ in the aluminum titanate is selected such that a mass ratio of $TiO_2:Al_2O_3$ is in a range of approximately 0.75 to approximately 0.95. Particularly advantageous is a ratio in which a molar titanium dioxide excess is present, for example, a mass ratio of $TiO_2:Al_2O_3$ of >0.8 (molar ratio>1.02). Particularly advantageous is a mass ratio of between approximately 0.8 and approximately 0.95. Particularly advantageous is moreover a mass ratio of $TiO_2:Al_2O_3$ between approximately 0.80 and approximately 0.90, and between approximately 0.80 and approximately 0.85, and between approximately 0.81 and approximately 0.82.

As already mentioned, a ceramic body according to the invention can be produced by plastic shaping methods, for example, extrusion. However, it is also possible to impregnate a non-ceramic support web with a ceramic slip and subsequently fire it in the desired geometric shape until the support web is combusted and a rigid filter body is formed. With this kind of manufacture, slip properties are required that are significantly different from the properties of a material for a plastic shaping method. When producing a slip for an impregnation process, the addition of magnesium in the form of $MgTiO_3$, $Mg_2TiO_4$, $MgTi_2O_5$, or $MgAl_2O_4$ leads to improved slip properties such as improved rheology that is characterized, for example, by a viscosity of less than approximately 0.2 PaAs. In a preferred embodiment, the viscosity is less than approximately 0.1 PaAs and less than approximately 0.05 PaAs and less than approximately 0.02 PaAs. If nothing to the contrary is mentioned, the viscosity was measured by a Brookfield rheometer type RVDV III+ CP with cone/plate (cone 42) between 5 and 100 revolutions per minute at a temperature of approximately 25° C. In a preferred embodiment, the viscosity was measured between 5 to 30 revolutions per minute or 15 to 25 revolutions per minute, for example, at 20 revolutions per minute.

Properties that are characteristic of an improved rheology comprise also increased long-term stability and higher solids content (SC). Without being tied to a certain theory, it is assumed that the reason for improved properties is the avoidance of generation $Mg^{2+}$ ions in the ceramic slip. These double-charged magnesium ions cause a strong increase of the charge density in the electrical double layer and thus cause a significant enhancement of the shielding of the surface charge of the particles which entails a reduction of the thickness of the electrochemical double layer. The reduction of the electrical double layer in the colloidal slip system has a direct effect on the slip rheology (strong viscosity increase in combination with a pronounced shear thinning). When the particle spacing due to the compression of the double layer thickness is reduced to such an extent that the attractive interaction (van-der-Waals attraction) dominates the repulsive forces, a coagulation of the particles occurs and, possibly, also particle sedimentation. Slip systems with pronounced shear thinning (see FIG. 2, curves S1 and S6) are in principle suitable for producing filter bodies by means of so-called impregnation technology. However, clogging of the passages of the filter body and thus locking of the pore structures may occur which is not preferred.

Increased long-term stability of the slip is to be understood particularly as a substantially unchanged viscosity for a duration of 12 hours, 24 hours, preferably 48 hours. A viscosity that is substantially unchanged is to be understood such that the aforementioned change of the viscosity takes place in a range of less than approximately ±20%, preferably in a range of less than approximately ±10%, even more preferred in a range of less than approximately +5%. In a preferred embodiment, no significant sedimentation or no sedimentation at all occurs over a duration of more than 12 hours, 24 hours, preferably of more than 48 hours. The increased long-term stability enables a production with uniform quality and high economic efficiency.

It has been found to be advantageous for the ceramic body to provide a quantity of MgO which is in a range of approximately 0.4 to approximately 3.0% by weight. Particularly advantageous are quantities of MgO between approximately 0.5 and approximately 1.5% by weight, and between approximately 0.8 and approximately 1.3% by weight, between approximately 0.9 and approximately 1.3% by weight, between approximately 0.9 and approximately 1.1% by weight.

The ceramic body of the present invention can have a porosity between approximately 25% and approximately 70%. Preferably, the porosity is between approximately 30% and approximately 60%, even more preferred between approximately 35% and approximately 55%. The porosity of the ceramic body is determined by means of mercury (Hg) porosimetry wherein the device type is, for example, the device Pascal 140/440 of the company Thermo Fischer.

In this context, the average arithmetic pore radius of the ceramic body can be between approximately 0.1 μm and approximately 20 μm, preferably between approximately 0.5 μm and approximately 15 μm, even more preferred between approximately 0.8 μm and approximately 10 μm, furthermore preferred between approximately 1.0 and approximately 5.0 μm, and most preferred between approximately 2.0 μm and approximately 3.0 μm.

The median value of the pore radius can be between approximately 0.1 μm and approximately 20.0 μm, more preferred between approximately 1.0 µm and approximately 20.0 µm, even more preferred between approximately 10.0 µm and approximately 18.0 µm, even more preferred between approximately 13.0 µm and approximately 17.0 µm, and most preferred between approximately 14.5 µm and approximately 15.5 µm.

The average pore radius and the median value of the pore radius are determined by means of Hg porosimetry wherein as a device type the device Pascal 140/440 of the company Thermo Fischer was used. Alternatively, a scanning electron microscope (SEM) can be used also for measuring.

The present invention concerns also a ceramic slip. The slip according to the invention has in one embodiment the following composition:
i) between approximately 50.0% by weight and approximately 60.0% by weight $Al_2O_3$;
ii) between approximately 40.0% and approximately 46.0% by weight $TiO_2$;
iii) between approximately 0.0 and approximately 5.0% by weight $SiO_2$;
iv) between approximately 0.0 and approximately 4.0% by weight MgO;
v) between approximately 0.0 and approximately 5.0% by weight dispersing agent;
vi) between approximately 0.0-approximately 1.0% by weight CaO; and
vii) optionally solvent;
wherein the solvent is preferably water or alcohol or an alcohol/water mixture.

In a preferred embodiment, the water is completely deionized water. Preferably, the alcohol is selected from the group consisting of methanol, ethanol, isopropanol, butanol, glycerin, ethylene glycol, n-propyl alcohol, n-hexyl alcohol, secondary butyl alcohol, isobutyl alcohol, tertiary butyl alcohol, trimethyl carbinol, isoamyl alcohol, 1,2-glycol, propylene glycol, trimethylene glycol, tetramethylene glycol, hexamethylene glycol, octamethylene glycol, nonamethylene glycol, or the like. The aforementioned % by weight values relate to the dry mass of the slip without addition of the solvent.

The % values given under (i) to (iv) and (vi) for the ceramic slip relate to the quantity ratios of the respective metal oxides. Should a component in the ceramic slip not be present in the form of the oxide, the proportion of the respective metal or metal ion is based on the quantity of its oxide. For example, when in the slip the $Mg^{2+}$ ion is present and/or $MgTiO_3$, $Mg_2TiO_4$, $MgTi_2O_5$, $MgAl_2O_4$, the % by weight values for MgO are given.

A ceramic slip has been found to be advantageous that has a quantity of dispersing agent that is in a range of approximately 0.1 to approximately 4.0% by weight. Particularly advantageous are quantities of dispersing agent between approximately 0.1 and approximately 3.0% by weight. Suitable dispersing agents are, for example, $C_1$-$C_{20}$ carboxylic acids, carboxylic acid esters, and salts of polycarboxylic acids or polyacrylic acids or carboxylic acid preparations or mixtures of the afore mentioned compounds. A preferred dispersing agent is Dolapix CE64 of the company Zschimmer & Schwartz.

Particularly advantageous is a ceramic slip that contains a quantity of $Al_2O_3$ between approximately 52.0% and approximately 55.0% by weight, preferably between approximately 53.0% and approximately 54.0% by weight of $Al_2O_3$.

Particularly advantageous is a ceramic slip that comprises a quantity of $TiO_2$ between approximately 42.0 and approximately 43.0% by weight of $TiO_2$, preferably between approximately 42.0% and approximately 42.2% by weight $TiO_2$.

Particularly advantageous is a ceramic slip that contains a quantity of $SiO_2$ between approximately 2.0 and approximately 3.0% by weight $SiO_2$, preferably between approximately 2.7 and approximately 2.9% by weight $SiO_2$.

Particularly advantageous is a ceramic slip that contains a quantity of MgO between approximately 1.0 and approximately 2.0% by weight MgO, preferably between approximately 1.2 and approximately 1.5% by weight MgO.

The solids content of the slip according to the invention should be preferably in a range of approximately 45 to approximately 75%. Particularly advantageous is a solids content between approximately 55 and approximately 75%, and most preferred between approximately 58 and approximately 68%.

An improved rheology of the slip can have a positive effect on the properties of the ceramic slip. As a ceramic slip, preferably a slip is used that has a viscosity of less than approximately 0.2 PaAs, preferably less than approximately 0.1 PaAs, and even more preferred less than approximately 0.05 PaAs, and most preferred less than approximately 0.02 PaAs. In this context, the viscosity of the slip is measured with a Brookfield rheometer type RVDV III+ CP with cone/plate (cone 42) between approximately 5 and 100 revolutions per minute at a temperature of approximately 25° C.

In order to enable a uniform impregnation of the support material with the ceramic slip, the components of the ceramic slip preferably have suitable particle size distributions so that they can penetrate into the pores of the support material.

The $Al_2O_3$ component of the ceramic slip has preferably a particle size distribution d90 between approximately 0.1 µm and approximately 4.0 µm. Particularly advantageous is a particle size distribution d90 between approximately 1.0 and approximately 3.0 µm, more preferred between approximately 2.0 and approximately 3.0 µm, and most preferred between approximately 2.5 and approximately 2.8 µm. In a further embodiment, the $Al_2O_3$ component of the ceramic slip has a particle size distribution d50 between approximately 0.1 µm and approximately 1.5 µm. Particularly advantageous is a particle size distribution d50 between approximately 0.1 and approximately 1.0 µm, more preferred between approximately 0.4 and approximately 0.8 µm, and most preferred between approximately 0.6 and approximately 0.8 µm. The particle size distributions d90 and d50 relate to the volume distribution, if nothing different is indicated.

The $TiO_2$ component of the ceramic slip has preferably a particle size distribution d90 between approximately 0.1 µm and approximately 1.0 µm.

Particularly advantageous is a particle size distribution d90 between approximately 0.2 and approximately 0.8 µm, preferably between approximately 0.4 and approximately 0.6 µm, and most preferred between approximately 0.5 and approximately 0.6 µm. In a further embodiment, the $TiO_2$ component of the ceramic slip has a particle size distribution d50 between approximately 0.1 µm and approximately 1.0 µm. Particularly advantageous is a particle size distribution d50 between approximately 0.1 and approximately 0.5 µm, and most preferred between approximately 0.2 and approximately 0.3 µm.

The glass frit as $SiO_2$ source that is added to the ceramic slip has preferably a particle size distribution d90 between approximately 5.0 µm and approximately 20.0 µm. Particularly advantageous is a particle size distribution d90 between approximately 10.0 and approximately 15.0 µm, preferably between approximately 13.0 and approximately 14.0 µm, and most preferred between approximately 13.0 and approximately 13.5 μm. In a further embodiment, the glass frit as $SiO_2$ component of the ceramic slip has a particle size distribution d50 between approximately 0.1 μm and approximately 10.0 μm. Particularly advantageous is a particle size distribution d50 between approximately 2.0 and approximately 8.0 μm, preferably between approximately 6.0 and approximately 7.0 μm, and most preferred between approximately 6.4 and approximately 6.6 μm.

The MgO source (for example as $MgTiO_3$, $Mg_2TiO_4$, $MgTi_2O_5$, or $MgAl_2O_4$) of the ceramic slip has preferably a particle size distribution d90 between approximately 0.1 μm and approximately 5.0 μm. Particularly advantageous is a particle size distribution d90 between approximately 1.0 and approximately 4.0 μm, preferred between approximately 2.0 and approximately 3.0 μm, and most preferred between approximately 2.9 and approximately 3.0 μm. In a further embodiment, the MgO source of the ceramic slip has preferably a particle size distribution d50 between approximately 0.1 μm and approximately 5.0 μm. Particularly advantageous is a particle size distribution d50 between approximately 1.0 and approximately 3.0 μm, preferably between approximately 1.0 and approximately 2.0 μm, and most preferred between approximately 1.2 and approximately 1.4 μm.

Advantageous is a ceramic slip that is wherein the particles in the mixture are present as non-agglomerated particles with d90 values smaller than approximately 3.2 μm. Particularly advantageous are non-agglomerated particles with d90 values smaller than approximately 2.0 μm, preferably smaller than approximately 1.0 μm, and most preferred smaller than approximately 0.3 μm. In a further embodiment, the particles in the mixture have as non-agglomerated particles a d50 value smaller than approximately 0.4 μm. Particularly advantageous are non-agglomerated particles with d50 values smaller than approximately 0.3 μm, preferably smaller than approximately 0.2 μm, and most preferred smaller than approximately 0.1 μm.

Non-agglomerated particles are particles that have been ground to a primary particle size and as such are present dispersed in the slip. The ceramic slip can contain proportions of nano-scale particles with a size of less than 100 nm.

The determination of the different particle size distributions was performed by means of laser diffraction with the device CILAS 1090L of the company Quantachrome. The measurement was done in water in diluted form with addition of 1.5 ml of a 5% solution of BYK 180 of the company BYK Chemie as a dispersing agent into the dispersion tank and optionally with use of ultrasound. The evaluation was carried out according to the Fraunhofer theory.

In an especially advantageous embodiment of the ceramic body according to the invention, the ceramic slip that is serving as the starting material contains organic additives, for example, organic polymers, for example polyvinyl acetate (PVA), polyvinyl pyrrolidone (PVP), polyamides, polystyrenes, polyurethanes, polypropylene, polyethylene, or polypropylene polyethylene copolymers. Also, suitable thixotropic agents, wetting agents, pore forming agents, defoaming agents, and rheologic additives, or combinations thereof, may be added to the slip. These additives can be added each in a quantity of 0-5% by weight, preferably 0-2.5% by weight, wherein the weight quantities relate to the total weight of the slip without the solvent proportion.

These additives can either be added individually or in combination. The addition of these additives has a positive effect on the slip rheology and on flowing and wetting properties and enables a targeted adjustment of the porosity and pore size/pore distribution; this leads to an improvement of the filter performance, of the component homogeneity, and the mechanical strength. Moreover, these additives improve the infiltration behavior of the slip in the paper and the adhesion of the individual ceramic particles on the paper fibers and enable thus a targeted improvement of the wet-ceramic paper body for avoiding damage caused by the drying process, for example, cracks, washed-out slip, structural inhomogeneities etc. Shaping of the body is done either before or after impregnation with the ceramic slip.

Thixotropic agents in the meaning of the present invention are all substances that cause a thixotropic behavior of liquids. Examples of suitable thixotropic agents are solvents of modified urea, for example, a solution of BYK-420 of the company BYK Chemie.

A pore forming agent in the meaning of the present invention is any substance that is added to the slip and that causes the formation of pores in the finish-fired ceramic body. Examples of suitable pore forming agents are carbon or polymers such as, for example, polyamides, polystyrenes, polyurethanes, polypropylene, polyethylene, polyvinyl acetate, polyvinyl pyrrolidone, acrylates and starch, or native wheat starch, and wood flour, or combinations of the aforementioned agents. In a preferred embodiment, polyamide with a size of 0.5-90 μm is used, such as Vestosint 2070 natural color (company Evonik)

A wetting agent in the meaning of the present invention is any substance that is added to the slip in order to increase wetting and wettability of surfaces. Wetting agents are used in order to increase the contact between the support webs (solid phase) and the slip (liquid phase) and to enable the incorporation of hydrophobic organic components such as polyamide as pore forming agent in aqueous slip systems. Examples of suitable wetting agents are modified siloxanes, for example, polyether modified siloxane such as BYK-348 of the company BYK Chemie, or non-ionic solutions of an acrylate copolymer, such as BYK-380N of the company BYK Chemie.

A rheologic additive in the meaning of the present invention is any substance that is added to the slip in order to increase the rheologic properties of the slip.

A defoaming agent in the meaning of the present invention is any substance that is added to the slip in order to avoid foam formation. Examples of such a suitable defoaming agent is a mixture of polysiloxane and hydrophobic solids in polyglycol, for example, BYK-028 of the company BYK Chemie which is a mixture of a polysiloxane and hydrophobic solids in polyglycol. The quantity of the defoaming agent is preferably between approximately 0 and approximately 0.5% by weight relative to the total slip, including solvent.

A further criterion for evaluating the properties of the ceramic slip is electrical conductivity that expresses the capability of the ceramic body to conduct electrical current. An electrical conductivity of the ceramic slip of the present invention that is less than 1,500 μS/cm, preferably less than 1,000 μS/cm, more preferred less than 800 μS/cm, and most preferred less than 600 μS/cm, is considered to be advantageous.

The present invention is also directed to a method for producing a ceramic body that comprises the following steps:
(a) providing a combustible non-ceramic support web;
(b) impregnating the support web with a ceramic slip;
(c) optional pyrolysis of the support web;
(d) sintering under oxidic and/or non-oxidic atmosphere and thus formation of a rigid body.

In the context of the present invention, a support web is any web that is suitable to be wetted by the slip. The support web can be selected from organic material wherein the organic material comprises preferably paper and cellulose. Alternatively, the support web can be selected from synthetic material wherein the synthetic material comprises preferably synthetic fibers. The support web is formed to the desired geometric shape that is preferably maintained while the method is carried out.

The method for producing a ceramic body comprises the use of a ceramic slip of the present invention. The ceramic slip can be ground until the desired particle size is reached. The components of the ceramic slip can be ground until a particle size distribution d90 of less than approximately 3.2 μm is achieved, preferably less than approximately 2.0 μm, even more preferred less than approximately 1.0 μm, and most preferred less than approximately 0.3 μm. The components of the ceramic slip can be ground until a particles size distribution d50 of less than approximately 0.4 μm has been reached, preferably less than approximately 0.3 μm, more preferred less than approximately 0.2 μm, and most preferred less than approximately 0.1 μm. For grinding the ceramic slip, an agitator ball mill can be used.

The step (b) of the method for producing a ceramic body according to the present invention comprises impregnation of the support web with a ceramic slip for less than approximately 10 minutes, more preferred less than approximately 5 minutes, even more preferred less than approximately 2 minutes, still more preferred less than approximately 1.5 minutes, and most preferred less than approximately 1 minute.

After the method step (b), the impregnated support web can be allowed to have the slip drip off. The impregnated support web during the dripping step can be turned over, wherein it is preferably turned over twice. The dripping time comprises approximately less than 1 hour, preferred less than approximately 45 minutes, and most preferred less than approximately 30 minutes.

The impregnated support can be additionally dried web after the dripping step after the method step (b). Drying of the impregnated support web comprises approximately 20 minutes up to approximately 6 hours, preferably approximately 40 minutes to approximately 4 hours, most preferred approximately 1 to approximately 3 hours. Drying of the impregnated support web may include electromagnetic radiation, preferably radio wave radiation or microwave radiation. Drying of the impregnated support web can be carried out in a continuous dryer and/or in a drying cabinet.

The optional step (c) of the method for producing a ceramic body in accordance with the present invention comprises the pyrolysis of the dried support web wherein the pyrolysis preferably is carried out under an inert gas atmosphere. In a preferred embodiment, the inert gas atmosphere comprises nitrogen, argon, and/or all noble gases and combinations thereof.

In a preferred embodiment, the pyrolysis is carried out at a temperature between approximately 20 and approximately 1,000° C., preferably at approximately 1,000° C. In a further preferred embodiment, the pyrolysis is carried out for a duration between approximately 1 and approximately 10 hours, preferably between approximately 2 and approximately 6 hours. A person of skill in the art can adjust the required pyrolysis time as a function of the maximum temperature, i.e., comparable or identical results at lower temperatures, for example, 800° C., can be obtained when the duration is accordingly adjusted.

The step (d) of the method for producing a ceramic body in accordance with the present invention comprises burning out, wherein sintering its preferred. Sintering can be done in an oxidizing atmosphere. Burning out the support web comprises a maximum temperature between approximately 1,000° C. and 2,000° C., more preferred between approximately 1,200° C. and 1,800° C., more preferred between approximately 1,300° C. and 1,600° C., and most preferred between approximately 1,360° C. and 1,500° C.

Moreover, in one embodiment according to the invention, an outer layer is applied onto the rigid filter body. In particular, the materials that are used for the outer layer comprise the same material as the filter body or an aluminum silicate ceramic cement, for example, ceramic cement CC 180W of the company Ceprotec or a mixture of same-type filter material (aluminum titanate) and an aluminum silicate ceramic cement as a bonding agent. For example, the material used for the outer layer can comprise an embodiment disclosed in the documents DE 10 2009 001 820 A1, DE 10 2009 010 207 A1, EP 1 688 171 B1, U.S. Pat. No. 7,560,154 B2, U.S. Pat. No. 7,591,918 B2, U.S. Pat. No. 7,651,755 B2, US 2009/0286041 A1, and WO 2009/070250 A1.

In a further embodiment, the method comprises moreover the step that the end faces of the ceramic body are cut off.

When producing the ceramic body according to the invention by using the ceramic slip for impregnating non-ceramic support webs such as paper, cellulose, it is advantageous to provide a particle size distribution of d90<2 μm because only these particles can infiltrate completely into the fiber structure. Primarily because of the very small and non-agglomerated particles present after the wet-grinding process in the submicron range of <0.5 μm (d90), in particular however <0.25 μm (d90) and <0.15 μm (d50), a particularly uniform homogenous colloidal dispersion of the individual raw material particles (for example, $Al_2O_3$, $TiO_2$, $SiO_2$, $MgTiO_3$ etc.) in the slip system and in the future component can be realized.

A great advantage with respect to the processing method resides in the stable colloidal dispersed particle distribution that is obtainable in this way in comparison to the usually employed shaping method (extrusion). Accordingly, and as a result of the very short diffusion paths for such submicron particles, an extremely homogenous and high-degree (complete) formation of the aluminum titanate phase and a very effective and uniform phase stabilization by inorganic additives (for example, $SiO_2$, MgO, CaO, $Fe_2O_3$ etc.) is ensured. The result of a suitable material or raw material selection, of a very homogenous material distribution, and of short diffusion paths is expressed significantly in the high breakdown resistance (extremely low TEC values (compare table) after thermal aging (in oxidizing or reducing atmosphere).

The ceramic body according to the invention is comprised of a temperature-resistant material and is therefore suitable e.g. for use as a diesel particulate filter. By selecting the composition in accordance with the present invention the material properties can be affected better and the structural properties can be adjusted better. The filter device according to the invention shows an excellent resistance to temperature changes and a low thermal expansion.

In the following table some examples of ceramic bodies with the composition according to the invention with appropriate thermal expansion coefficients (TEC) and an evaluation of the slip properties are listed.

TABLE 1

| Composition | TEC α (*$10^{-6}$ 1/K) | | Remarks | Evaluation of the slip properties (SP) and of the TEC |
|---|---|---|---|---|
| (% by weight) | oxidizing | reducing | | |
| S1 | 1.24 | n.a. | $SiO_2$ and iron | SP: – |
| $Al_2O_3$: 53.2 | (20-800°) | | source: | (high slip viscosity) |
| MgO: 0.5 | 1.82 | n.a. | illite, synthetic | TEC: – |
| $TiO_2$: 42.2 | (20-1,000° C.) | | glass frit type 1 | |

TABLE 1-continued

| Composition (% by weight) | TEC α (*10⁻⁶ 1/K) oxidizing | TEC α (*10⁻⁶ 1/K) reducing | Remarks | Evaluation of the slip properties (SP) and of the TEC |
|---|---|---|---|---|
| Fe₂O₃: 0.2<br>SiO₂: 2.5<br>Impurities 1.4 | | | MgO source:<br>MgO or<br>Mg(OH)₂ | |
| S6<br>Al₂O₃: 53.4<br>MgO: 1.0<br>TiO₂: 42.1<br>Impurities 0.3<br>SiO₂: 3.1 | 1.69<br>(20-800°)<br>2.33<br>(20-1,000° C.) | n.a.<br><br>n.a. | SiO₂ source:<br>silica sol type 1 | SP: --<br>(high slip viscosity)<br>TEC: -- |
| S14<br>Al₂O₃: 52.2<br>MgO: 1.0<br>TiO₂: 43.0<br>CaO: 0.4<br>SiO₂: 3.1<br>Impurities 0.3 | −0.27<br>(20-800°)<br>0.26<br>(20-1,000° C.) | 0.42<br>(20-800°)<br>1.45<br>(20-1,000° C.) | SiO₂ source:<br>synthetic glass<br>frit type 2<br>MgO source:<br>magnesium<br>titanate | SE: ++<br>TEC: ++<br>(without thermal<br>aging:<br>α = −0.2 * 10⁻⁶ 1/K<br>(20-1,000° C.)) |
| S15<br>Al₂O₃: 52.9<br>MgO: 1.0<br>TiO₂: 42.4<br>CaO: 0.5<br>SiO₂: 3.0<br>Impurities 0.2 | −0.09<br>(20-800°)<br>0.42<br>(20-1,000° C.) | 0.47<br>(20-800°)<br>1.27<br>(20-1,000° C.) | SiO₂ source:<br>synthetic glass<br>frit type 2<br>MgO source:<br>magnesium<br>titanate | SE: ++<br>TEC: ++<br>(without thermal<br>aging:<br>α = −0.1 * 10⁻⁶ 1/K<br>(20-1,000° C.)) |

TEC: thermal expansion coefficient

TABLE 2

The evaluation of the measured properties of the ceramic body and of the slip were carried out as follows:

| Measuring Range 20-1,000° C. | Description of Aging | -- very bad | - bad | 0 average | + good | ++ very good |
|---|---|---|---|---|---|---|
| TEC α (*10⁻⁶ 1/K) | before aging | >2.0 | >1.5 ... 2.0 | >1.2 ... 1.5 | >0.6 ... 1.2 | >−0.5 ... 0.6 |
| TEC α (*10⁻⁶ 1/K) | oxidizing, after 40 h at 1,100° C. in air (static) | >2.0 | >1.5 ... 2.0 | >1.2 ... 1.5 | >0.8 ... 1.2 | >−0.5 ... 0.8 |
| TEC α (*10⁻⁶ 1/K) | reducing, 1,050° C., 20 h in CO atmosphere (100 l/h) | >2.4 | >2.0 ... 2.4 | >1.7 ... 2.0 | >1.5 ... 1.7 | >−0.5 ... 1.5 |
| slip properties (SP) | evaluation by viscosity measurement | >0.1 PaAs | >0.6 ... 0.1 PaAs | >0.3 ... 0.6 PaAs | >0.2 ... 0.3 PaAs | <0.2 PaAs |
| | evaluation: visual | very viscous or much sedimentation | viscous or light sedimentation | viscous and no sedimentation | low viscosity and no sedimentation | very low viscosity and no sedimentation >24 h |

The thermal expansion coefficient is a characteristic value that describes the behavior of a material with regard to changes of its dimensions at temperature change. The thermal expansion coefficients (TEC) of bodies in particular on the basis of preparations S14 or S15 show extremely low values that even after thermal aging under oxidizing or reducing conditions are significantly below 1.5*10⁻⁶ 1/K (20-1,000° C.) which indicates an excellent breakdown resistance of the aluminum titanate. For commercially available diesel particulate filter components on the basis of aluminum titanate, TEC values of 1.0*10⁻⁶ 1/K (20-1,000° C.) were measured without thermal aging and even 4.2*10⁻⁶ 1/K (20-1,000° C.) after thermal aging in oxidizing atmosphere (same conditions as in the above table).

Preferably, the thermal expansion coefficients for the ceramic body of the present invention before aging is between approximately −0.5 and approximately 2.0*10⁻⁶ 1/K, preferably between approximately −0.5 and approximately 1.5*10⁻⁶ 1/K, further preferred between approximately −0.5 and approximately 1.2*10⁻⁶ 1/K, and most preferred between approximately −0.5 and approximately 0.6*10⁻⁶ 1/K, in a range of approximately 20° C.-1,000° C. After aging under oxidizing conditions the thermal expansion coefficients of the present invention in a range of approximately 20° C. to 1,000° C. have values of approximately −0.5*10⁻⁶ 1/K and approximately 2.0*10⁻⁶ 1/K, preferably between approximately −0.5 and approximately 1.5*10⁻⁶ 1/K, further preferred between approximately −0.5 and approximately 1.2*10⁻⁶ 1/K, and most preferred between approximately −0.5 and approximately $0.8*10^{-6}$ 1/K, or in a range of 20° C.-800° C. values between approximately −0.5*10⁻⁶ 1/K and approximately $2.0*10^{-6}$ 1/K, preferably between approximately −0.5 and approximately $1.2*10^{-6}$ 1/K, further preferred between approximately −0.5 and approximately $1.0*10^{-6}$ 1/K, and most preferred between approximately −0.5 and approximately $0.6*10^{-6}$ 1/K. Aging under oxidizing conditions can be carried out for example in air for a duration of 40 hours at 1,100° C. (static).

After aging in reducing conditions, the thermal expansion coefficients of the present invention, in a range of approximately 20° C.-1,000° C., have values between approximately $-0.5*10^{-6}$ 1/K and approximately $2.4*10^{-6}$ 1/K, preferably between approximately −0.5 and approximately $2.0*10^{-6}$ 1/K, further preferred between approximately −0.5 and approximately $1.7*10^{-6}$ 1/K, and most preferred between approximately −0.5 and approximately $1.5*10^{-6}$ 1/K, or in a range of 20° C. to 800° C. values between approximately $-0.5*10^{-6}$ 1/K and approximately $2.4*10^{-6}$ 1/K, preferably between approximately −0.5 and approximately $1.7*10^{-6}$ 1/K, further preferred between approximately −0.5 and approximately $1.5*10^{-6}$ 1/K, and most preferred between approximately −0.5 and approximately $1.0*10^{-6}$ 1/K. Aging under reducing conditions can be done, for example, in a CO atmosphere for a duration of 20 hours at 1,050° C. (100 l/h).

The viscosity curve of the preparation S1 (compare FIG. 2) shows shear thinning, i.e., a decreasing viscosity with increase of the shearing speed. Without being tied to a theory, it is assumed that the cause is the use of illite as a $SiO_2$ and iron source. This clay mineral contains, in addition to $SiO_2$, $Al_2O_3$ and $Fe_2O_3$, also foreign materials such as, for example, MgO, CaO etc. When combined with water, minimal quantities of foreign ions such as $Mg^{2+}$, $Ca^{2+}$ are dissolved in water. The shear thinning of the slip system S1 is based on compression of the electrical double layers by the presence of multivalent counter ions ($Mg^{2+}$). They are originating from the employed MgO source (MgO or $MgTiO_3$). This behavior is very unfavorable for the impregnation behavior of the coiled paper material because during the impregnation process and in the subsequent drying step hardly any or no shearing forces are acting on the slip. Accordingly, the slip viscosity remains high and draining of the slip excess from the coil after the impregnation process is difficult. Accordingly, ceramic layers with minimal porosity in the passages are formed which increases greatly the pressure loss of the component. Ceramic bodies according to the present invention produced from the preparation S1 show therefore significant inhomogeneities (inhomogeneous structure or porosity etc.) and often macroscopic defects (clogged channels, cracks, deformations etc.). The distinct structural viscosity of the slip preparation S6 results from a crosslinking reaction of the employed silica sol ($SiO_2$ source). This aging process is already observable after a very short period of time (<<1 hour). The polysilica particles form with each other Si—O—Si bonds; this causes gelling of the entire ceramic slip.

Figure 2:
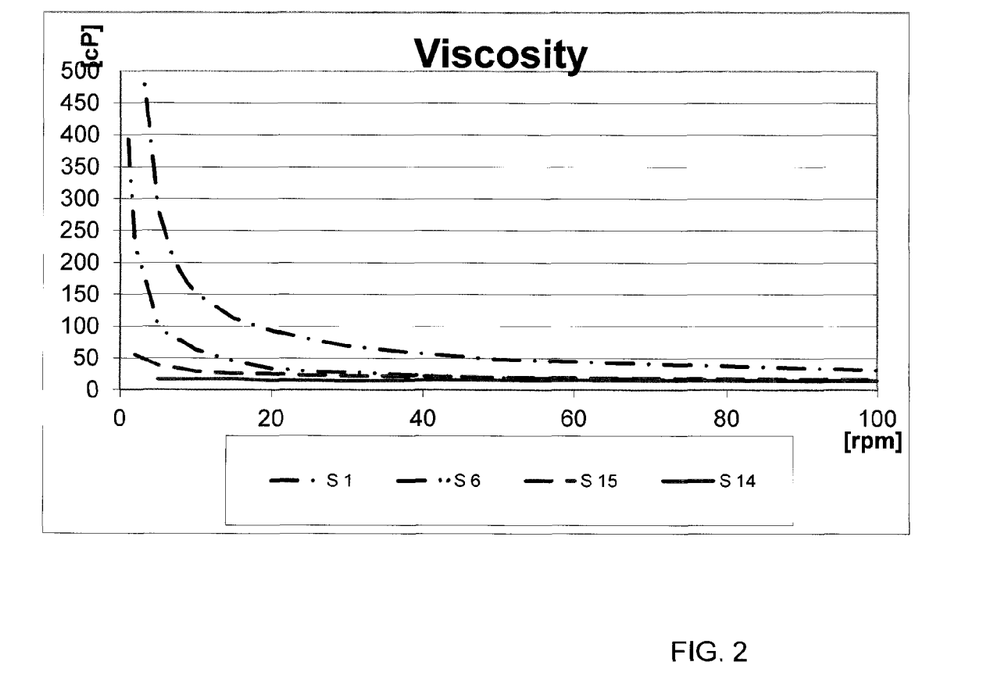
FIG. 2 shows viscosity curves of different preparations of the ceramic body according to the invention.

The viscosity curves of the preparations S14 and S15 show in contrast only a very minimal or no shear thinning behavior (Newton's viscosity behavior). Accordingly, the slip run-off after the impregnation process is greatly facilitated so that no or hardly any ceramic layers block the porous bulk structure of the passages. As MgO source in the preparations S14 and S15 magnesium titanate was employed so that no $Mg^{2+}$ ions go in solution. The mechanical properties of components on the basis of the preparations S14 and S15 fulfill completely the requirements for diesel particulate filters and particle filters for gasoline engines. The bursting pressures of corresponding filters can reach >10 bar.

By addition of certain organic additives such as polyvinyl acetate (PVA), polyvinyl pyrrolidone (PVP), polyamides, polystyrenes, polyurethanes, polypropylene, polyethylene, or propylene polyethylene copolymers, thixotropic agents, wetting agents, or combinations thereof, the following properties of the ceramic slip system and of the ceramic bodies produced therefrom can be affected in a positive way: rheologic properties, homogeneity, suitability for infiltration, mechanical strength, porosity.

The term "approximately" in the meaning of the present invention means a deviation of ±10%, preferably a deviation of ±5%, from the indicated numerical value.

In the following, as an example the manufacture of a ceramic body according to the invention is described. The example serves for explaining the invention and is not to be understood as limiting the subject matter of the present invention in any way.

Example 1

Step 1: Manufacture of the Base Slip

To 36.4 kg completely deionized water, 250 g Dolapix CE64 (company Zschimmer & Schwarz) as a dispersing agent are added with stirring. Then, 43.332 kg $Al_2O_3$ (type APA-05, company Sasol), 34.056 kg $TiO_2$ (type X200, company Kemira), 2.48 kg $MgTiO_3$ (magnesium titanium oxide, 99% metal basis, company Alfa Aesar, Johnson Mattey), and 3.593 kg glass frit (type 101911, company Ferro) were added in portions with strong stirring action.

After 5 hours of stirring the slip was ground with an agitator ball mill wherein the total energy introduction was approximately 13.0 kWh. After grinding, the electrical conductivity of the slip was approximately 500 to approximately 550 μS/cm, wherein the pH value was approximately 8.6. Subsequently, the slip was stirred for approximately 2 hours.

Step 2: Manufacture of the Immersion Slip

To the base slip produced in accordance with step 1, 14.753 kg completely deionized water is added with strong stirring action for diluting the base slip. Then, 134 g BYK 380N (company BYK Chemie), 2.697 kg Vestosint 2070 natural color (company Evonik), 2.617 kg PVP Luvitec K-90 solution, 20% by weight, and 134 g BYK 028 (company BYK Chemie) are added. Luvitec K-90 solution can be produced by dissolving 20% by weight Luvitec K-90 powder (company BASF) in 80% by weight water.

The mixture is strongly stirred for approximately 2 hours and then stirred slowly for approximately 1 hour.

Step 3: Immersion Process

As a non-ceramic support web, a paper blank (coil) is selected that is immersed for approximately 30 seconds into the finish-stirred immersion slip obtained by step 2. Subsequently, the impregnated paper coil is allowed to drip off for approximately 30 minutes at room temperature conditions wherein the paper coil after approximately 15 minutes is turned over.

Step 4: Drying Process

After the dripping action described in connection with step 3, the impregnated support web is then dried for approximately 20 to approximately 30 minutes in a microwave or radio wave drying device at approximately 100 to 130 W microwave power (per component).

Subsequently, the dried paper web for a time period of approximately 48 to approximately 72 hours is dried in a climate chamber at approximately 60° C. and approximately 10% relative humidity.

Step 5: Pyrolysis

Subsequently, the dried support web is pyrolyzed in an inert gas atmosphere to 1,000° C. with 6 hours residence time.

Step 6: Sintering Process

After completed pyrolysis (step 5), a sintering process under oxidizing air atmosphere at a temperature between approximately 1,400° C. and approximately 1,600° C. is carried out in a time period of approximately 5 to 20 hours.

While specific embodiments of the invention have been shown and described in detail to illustrate the inventive principles, it will be understood that the invention may be embodied otherwise without departing from such principles.

What is claimed is:

1. A ceramic body based on an aluminum titanate system, wherein the ceramic body has the following composition:
   i) approximately >95% by weight $Al_2O_3.TiO_2$;
   ii) approximately 0-approximately 2.0% by weight $Fe_2O_3$;
   iii) approximately 0-approximately 1.0% by weight BeO, BaO or CaO;
   iv) approximately 0-approximately 1.0% by weight $Li_2O$, $Na_2O$ or $K_2O$;
   v) approximately 0-approximately 2% by weight impurities,
   wherein the mass ratio $TiO_2:Al_2O_3$ is in a range between 0.80 and 0.95;
   wherein the quantity of $Al_2O_3.TiO_2$ is between 95 and 97% by weight;
   wherein a quantity of SiO2 is between 2.5 and 3.6% by weight;
   wherein a quantity of MgO is between 0.5 and 1.5% by weight.

2. A ceramic body based on an aluminum titanate system, the ceramic body having the following composition:
   wherein $Fe_2O_3$ is between approximately 0.2 and approximately 0.3% by weight;
   wherein BeO, BaO, or CaO is between approximately 0.4 and approximately 0.5% by weight;
   wherein CaO is approximately 0.2 and approximately 0.6% by weight, preferably between approximately 0.4 and approximately 0.5% by weight;
   wherein $Li_2O$, $Na_2O$ or $K_2O$ is between approximately 0.3 and approximately 0.5% by weight;
   wherein Na2O is between approximately 0.3 and approximately 0.5% by weight;
   wherein quantity of impurities is between approximately 0.2 and approximately 0.7% by weight;
   wherein $Al_2O_3.TiO_2$ is approximately >95% by weight;
   wherein the mass ratio $TiO_2:Al_2O_3$ is in a range between approximately 0.75 and approximately 0.95
   wherein $SiO_2$ is approximately 0.1-approximately 5.0% by weight; and
   wherein MgO is approximately 0.1-approximately 5.0% by weight.

3. A ceramic body based on an aluminum titanate system, the ceramic body having the following composition:
   i) between approximately 51.5 and approximately 53.5% by weight $Al_2O_3$
   ii) between approximately 41.5 and approximately 44.0% by weight $TiO_2$;
   iii) between approximately 2.8 and approximately 3.3% by weight $SiO_2$;
   iv) between approximately 0.9 and approximately 1.1% by weight MgO;
   v) between approximately 0.3 and approximately 0.6% by weight CaO:
   vii) between approximately 0.1 and approximately 0.4% by weight impurities
   viii) approximately >95% by weight $Al_2O_3.TiO_2$;
   ix) approximately 0-approximately 2.0% weight $Fe_2O_3$;
   x) approximately 0-approximately 1.0% by weight BeO, BaO or CaO;
   xi) approximately 0-approximately 1.0% by weight $Li_2O$, $Na_2O$ or $K_2O$;
   wherein the mass ratio $TiO_2:Al_2O_3$ that is in a range between approximately 0.75 and approximately 0.95.

4. The ceramic body according to claim 3, with the approximate composition selected from the group consisting of: (52.2% $Al_2O_3$; 43.0% $TiO_2$; 3.1% $SiO_2$; 1.0% MgO; 0.4% CaO; and 0.3% impurities), or (52.9% Al2O3; 42.4% TiO2; 3.0% SiO2; 1.0% MgO; 0.5% CaO; and 0.2% impurities).

5. The ceramic body according to claim 3, wherein the ceramic body has a porosity between approximately 30% and approximately 60%.

6. The ceramic body according to claim 3, wherein
   the ceramic body has an average arithmetic pore radius between approximately 0.1 and approximately 20 μm; or
   wherein the ceramic body has a median pore radius between approximately 10.0 and approximately 18.0 μm.

7. A ceramic slip, comprising the following composition:
   i) between approximately 52.0 and approximately 55.0% by weight $Al_2O_3$;
   ii) between approximately 42.0 and approximately 43.0% by weight $TiO_2$;
   iii) between approximately 2.0 and approximately 3.0% by weight $SiO_2$;
   iv) between approximately 1.0 and approximately 2.0% by weight MgO;
   v) between approximately 0.0 and approximately 1.0% by weight CaO;
   vi) a solvent selected from the group consisting of: water, alcohol, an alcohol/water mixtures, or an ethanol/water mixture;
   wherein the slip comprises between approximately 0.1 and approximately 4.0% by weight dispersing agent;
   wherein the dispersing agent is selected from the group consisting of $C_1$-$C_{20}$ carboxylic acids, carboxylic acid preparations, carboxylic acid esters, and salts of polycarboxylic acids, polyacrylic acids, or combinations thereof.

8. The ceramic slip according to claim 7, wherein the water comprises completely deionized water.

9. The ceramic slip according to claim 7, wherein
   the dispersing agent is between approximately 0.1 and approximately 3.0% by weight.

10. The ceramic slip according to claim 7, wherein
    the solids content is between approximately 55 and approximately 75%;
    wherein the $Al_2O_3$ component of the ceramic slip has a particle size distribution d90 between approximately 1.0 and approximately 3.0 μm;

wherein the TiO$_2$ component of the ceramic slip has a particle size distribution d90 between 0.2 and approximately 0.8 μm;

wherein the SiO$_2$ component of the ceramic slip has a particle size distribution d90 between approximately 10.0 and approximately 15.0 μm;

wherein the MgO component of the ceramic slip has a particle size distribution d90 between approximately 1.0 and approximately 4.0 μm;

wherein source if MgO is any of: MgTiO$_3$, Mg$_2$TiO$_4$, MgTi$_2$O$_5$, and MgAl$_2$O$_4$.

11. The ceramic slip according to claim 7, wherein all component particles in the mixture have a d90 value smaller than approximately 2.0 μm.

12. The ceramic slip according to claim 7, wherein the Al$_2$O$_3$ component of the ceramic slip has a particle size distribution d50 between approximately 0.1 μm and approximately 1.0 μm;

wherein the TiO$_2$ component of the ceramic slip has a particle size distribution d50 between approximately 0.10 μm and approximately 0.5 μm;

wherein the SiO$_2$ component of the ceramic slip has a particle size distribution d50 between approximately 6.0 μm and approximately 7.0 μm;

wherein the MgO component of the ceramic slip has a particle size distribution d50 between approximately 1.0 and approximately 2.0 μm.

13. The ceramic slip according to claim 7, wherein the particles in the mixture have a d50 value of smaller than approximately 0.3 μm;

wherein the slip is ground;

wherein the ceramic slip comprises additionally organic additives selected from the group consisting of thixotropic agents, wetting agents, pore forming agents, defoaming agents, rheologic additives, or combinations thereof;

wherein the ceramic slip contains at least one of: polyvinyl acetate (PVA), polyvinyl pyrrolidone (PVP), polyamides, polystyrenes, polyurethanes, polypropylene, polyethylene, polypropylene polyethylene copolymers, polyvinyl pyrrolidone (PVP), or combinations thereof of as organic additive.

14. The ceramic slip according to claim 13, wherein quantity of each of the organic additives relative to the total quantity of the slip independently is in a range between 0 and approximately 5% by weight;

wherein the quantity of each of the organic additives independently is in a range between 0% by weight and approximately 2.5% by weight;

wherein the ceramic slip has an electrical conductivity of less than 1,500 μS/cm.

15. A method for producing a ceramic body, comprising:
providing a combustible, non-ceramic support web;
impregnating the support web with a ceramic slip comprising the following composition:
i) between approximately 50.0 and approximately 60.0% by weight Al$_2$O$_3$;
ii) between approximately 40.0 and approximately 46.0% by weight TiO$_2$;
iii) between approximately 0.0 and approximately 5.0% by weight SiO$_2$;
iv) between approximately 0.0 and approximately 4.0% by weight MgO;
v) between approximately 0.0 and approximately 5.0% by weight dispersing agent;
vi) between approximately 0.0 and approximately 1.0% by weight CaO;
vii) a solvent selected from the group consisting of: water, alcohol, an alcohol/water mixtures, or an ethanol/water mixture;

pyrolysis of the support web;

sintering the impregnated support web under oxidic and/or non-oxidic atmosphere to form a rigid ceramic body;

wherein the non-ceramic support web is selected from the group consisting of: an organic material, a paper or cellulose material, a synthetic material, or synthetic fibers;

wherein the source of SiO$_2$ is a glass frit;

wherein the glass frit is a CaO glass frit having CaO and SiO$_2$;

wherein the method further comprises the step of bringing the non-ceramic support web into a desired geometric shape;

wherein individual components of the ceramic slip are ground until a particle size distribution d90 smaller than approximately 3.2 μm is reached;

wherein the impregnated support web after the impregnating step is allowed to drip;

wherein the method further comprises drying the dripped impregnated support web by at least one of: electromagnetic radiation, microwave radiation, drying in a continuous dryer, drying in a drying cabinet;

wherein the pyrolysis step is carried out in an inert gas atmosphere having at least one of: nitrogen, argon, or further noble gases;

wherein the pyrolysis is carried out at a temperature between approximately 20 degrees C. and approximately 1,000 degrees C.

16. The method for producing a ceramic body according to claim 15, wherein the pyrolysis step is carried out in the sintering step as burning out of the combustible support web;

wherein the sintering step is carried out in oxidizing atmosphere;

wherein burning out is carried out at a maximum temperature between approximately 1,000 degrees C. and 2,000 degrees C.;

wherein after the sintering step the method further includes applying an outer layer onto the rigid ceramic body.

17. The method for producing a ceramic body according to claim 15, wherein after the sintering step the method further comprises:
cutting of end faces of the ceramic body.

* * * * *